Figure 1:
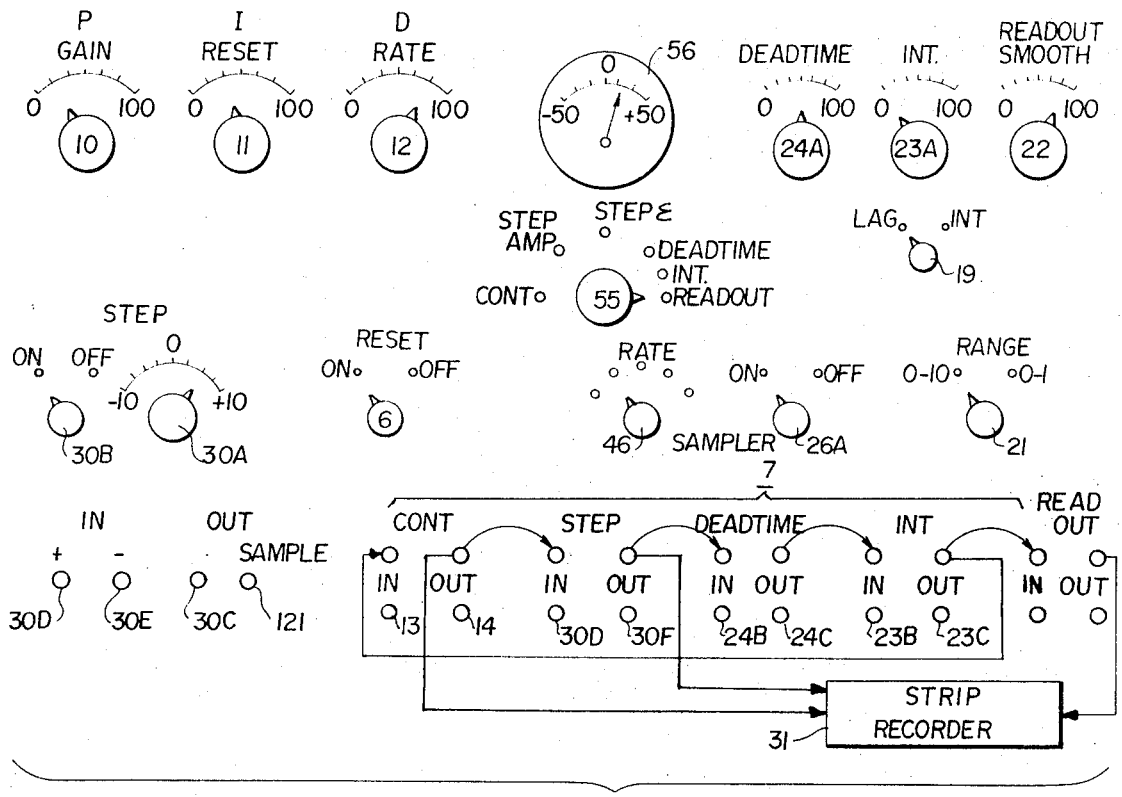

United States Patent [19]
Brooks

[11] 3,786,242
[45] Jan. 15, 1974

[54] PROCESS CONTROL SIMULATOR

[76] Inventor: Herbert B. Brooks, 600 Washington Ave., Haddonfield, N.J. 08033

[22] Filed: Sept. 23, 1971

[21] Appl. No.: 183,010

[52] U.S. Cl.............. 235/184, 235/151.1, 235/183, 328/151, 340/173 CA
[51] Int. Cl.............................................. G06g 7/66
[58] Field of Search................. 235/183, 184, 151, 235/151.1, 150.1; 318/609, 610; 328/151; 340/173 CA

[56] References Cited
UNITED STATES PATENTS

| | | | |
|---|---|---|---|
| 3,566,241 | 2/1971 | Ross.............................. | 235/151.1 |
| 3,523,193 | 4/1970 | Hutcheon........................ | 318/609 |
| 3,391,315 | 7/1968 | Schwartzenberg................. | 318/609 |
| 3,505,512 | 4/1970 | Fricke et al..................... | 235/184 |
| 3,638,007 | 1/1972 | Brooks............................ | 235/184 |

FOREIGN PATENTS OR APPLICATIONS 1,182,284  2/1970  Great Britain...................... 318/609

OTHER PUBLICATIONS

Russel et al.: The Analog Computer as a Process Controller. Control Engineering Sept. 1957 p. 160–165.

Primary Examiner—Felix D. Gruber
Attorney—Wilfred G. Caldwell

[57] ABSTRACT

A process control simulator contains electronic circuits for modifying set-point control signals by summing, integrating, differentiating and introducing step functions on continuous, single or periodic bases to determine off-line the behavior of a process control system. Provisions are made for several interacting control loops, for dead-time delays and for faster than actual response times to speed up simulation. The dead-time delays are provided by scanning a set of storage capacitors with a variable speed scanning motor through a scanning control cycle of operation.

A three control loop controller section provides for setting the gain of the controller system and controlling integration and difference modes responsive to step disturbances introduced into an integration process after a selectable dead-time adjustment. The output signal is reproduced in the form of a process response waveform. Provisions are made for smoothing readout and responding to sluggish systems by a slow sampling technique.

An automatic zero adjust circuit is provided to compensate for drift once each operation cycle and is controlled by a logic circuit.

17 Claims, 15 Drawing Figures

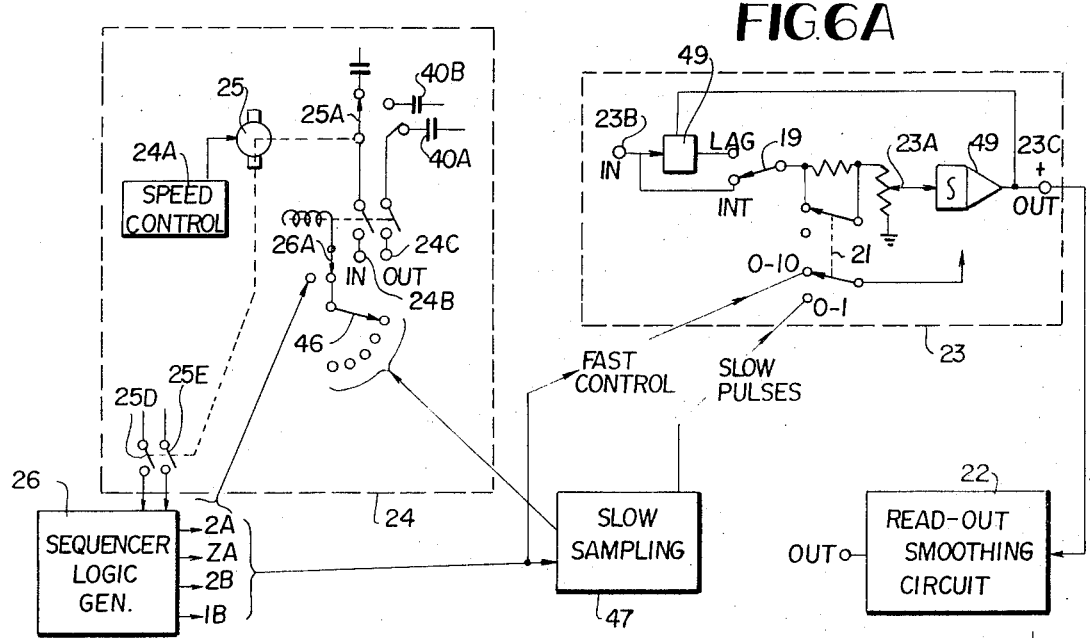
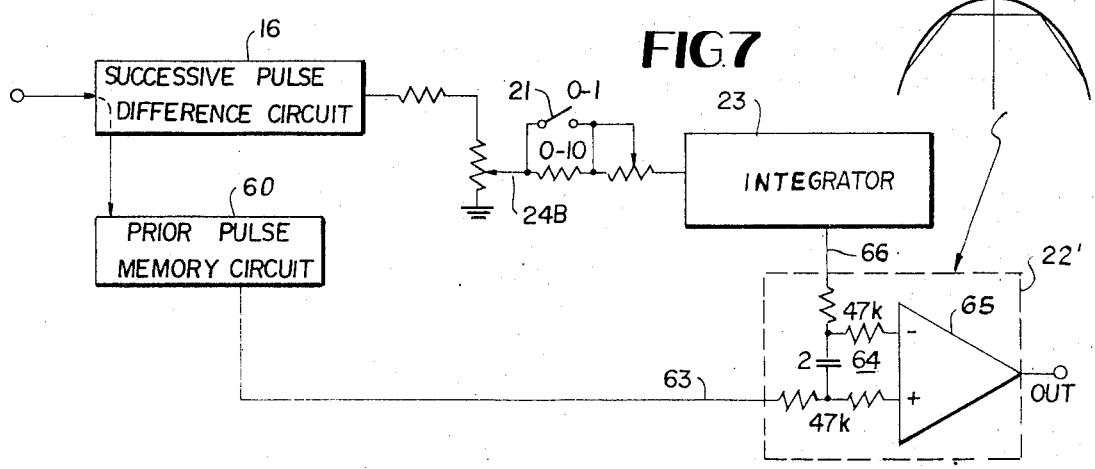
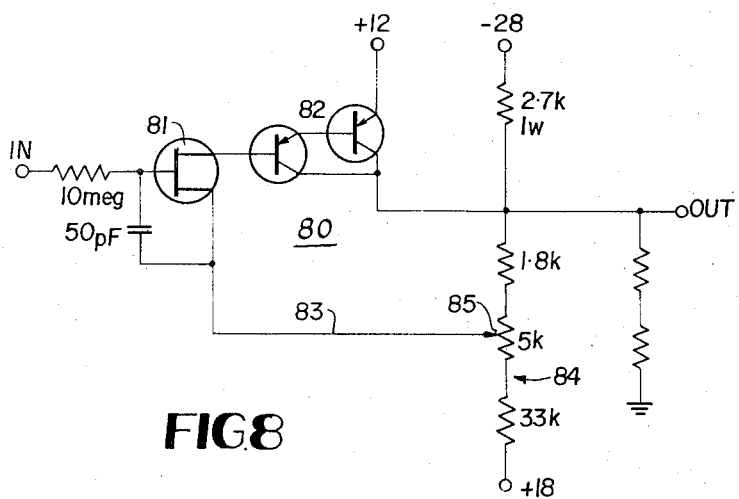
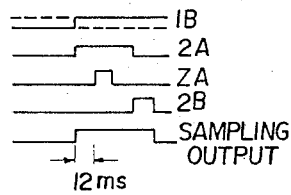

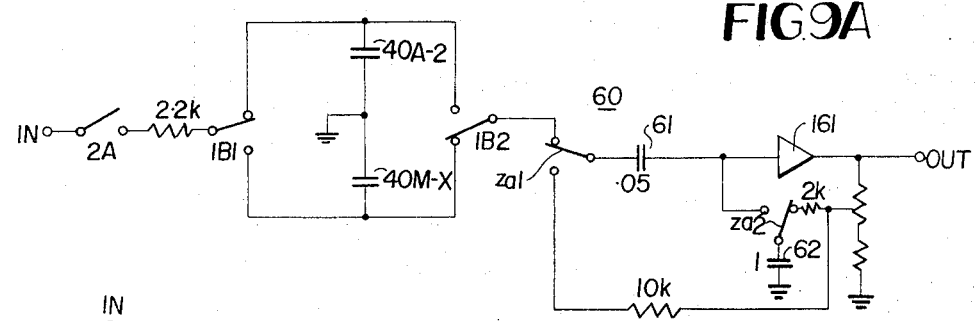
FIG.9A
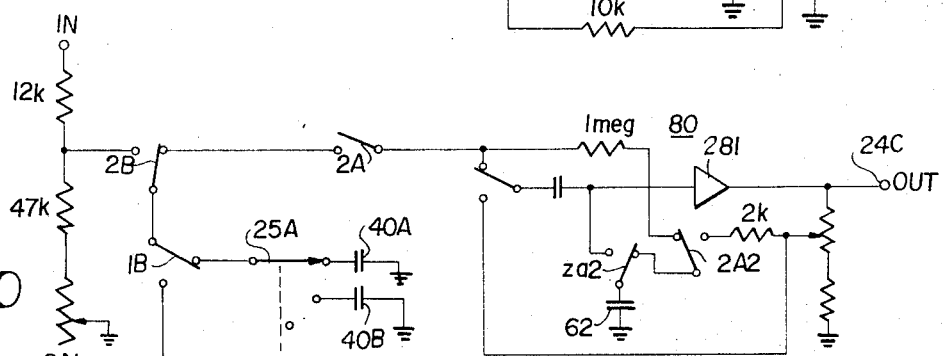
FIG.10
FIG.9B
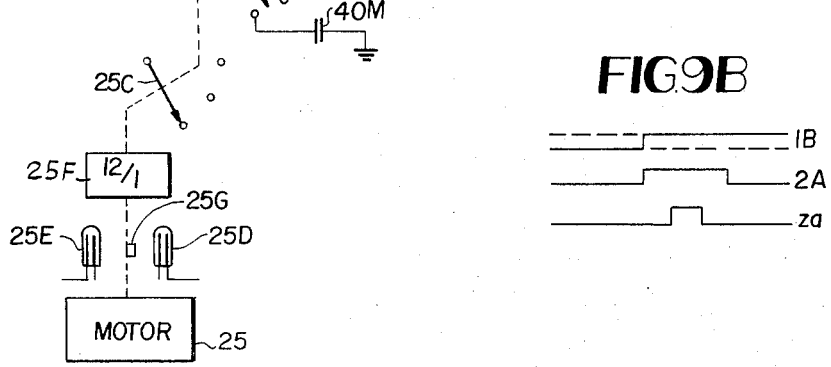
FIG.11
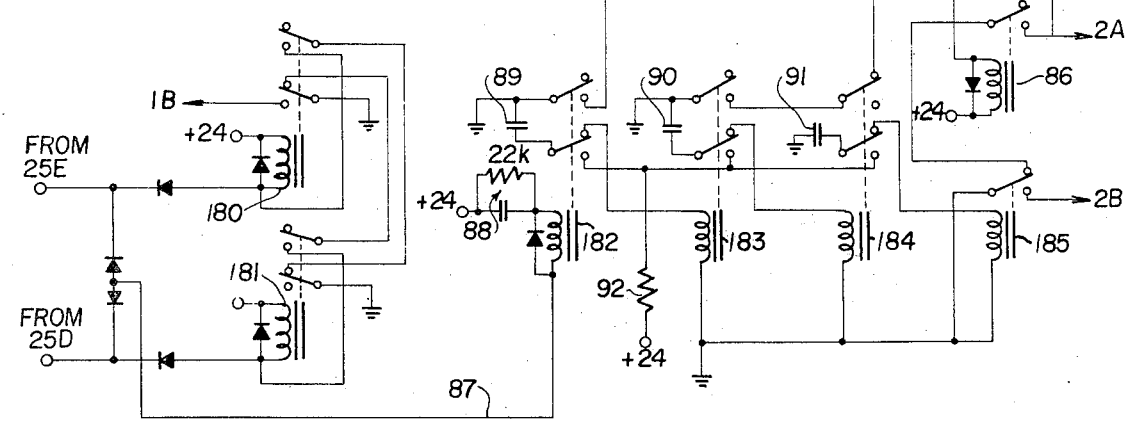

SHEET 5 OF 5

PROCESS CONTROL SIMULATOR

This invention relates to electronic process control apparatus and, more particularly, it relates to off-line simulation instruments providing manual control of various parameters encountered in an industrial control process.

In a typical industrial process subject to control, disturbances are encountered with loading or changes of materials or conditions of manufacture such as flow or temperature. Some parameters may drift and need correction or a process may need optimizing.

In some cases, a considerable delay is encountered before a response is initiated. For example, it takes time after applying heat before the temperature rises. In other processes the interaction of one process loop may affect other loops. For example, increasing the output rate may effect different changes in the flow rate, the temperature or the materials. Thus, it is sometimes necessary to determine the interactions of several operation modes.

A simulation instrument can be used to obtain experience related to a process quickly off-line. Thus, the change of variables may be analyzed so that troubleshooting information is developed for use in the on-line process. However, many processes involve long delay times or are so sluggish it is difficult to simulate conditions with electronic instrumentation. One problem with slow systems is the amount of drift that can occur in a set condition represented by substantially constant or slowly changing d-c control potentials over long periods of time.

It is, therefore, an object of this invention to provide an electronic instrument for simulating and analyzing output changes of industrial processes achieved by manipulation of input and control variables.

A more specific object of this invention is to provide an electronic process control simulator providing variable delay times.

Another object of the invention is to provide electronic process control instrumentation for simulating slow or sluggish systems without significant drift error.

Thus, in accordance with the invention, a three mode controller section is provided to establish variable levels of system gain, integration and difference modes. The controller section provides a typical signal affected by the various modes which is subjected to a typical process operation involving a step disturbance, a dead time and an integrating function to produce an output-condition potential on a chart strip recorder, for example. Various parameters in the controller and process operation sections may be manually chosen by appropriate controls to produce a simulation of the various parameters affecting the output.

Figure 2:
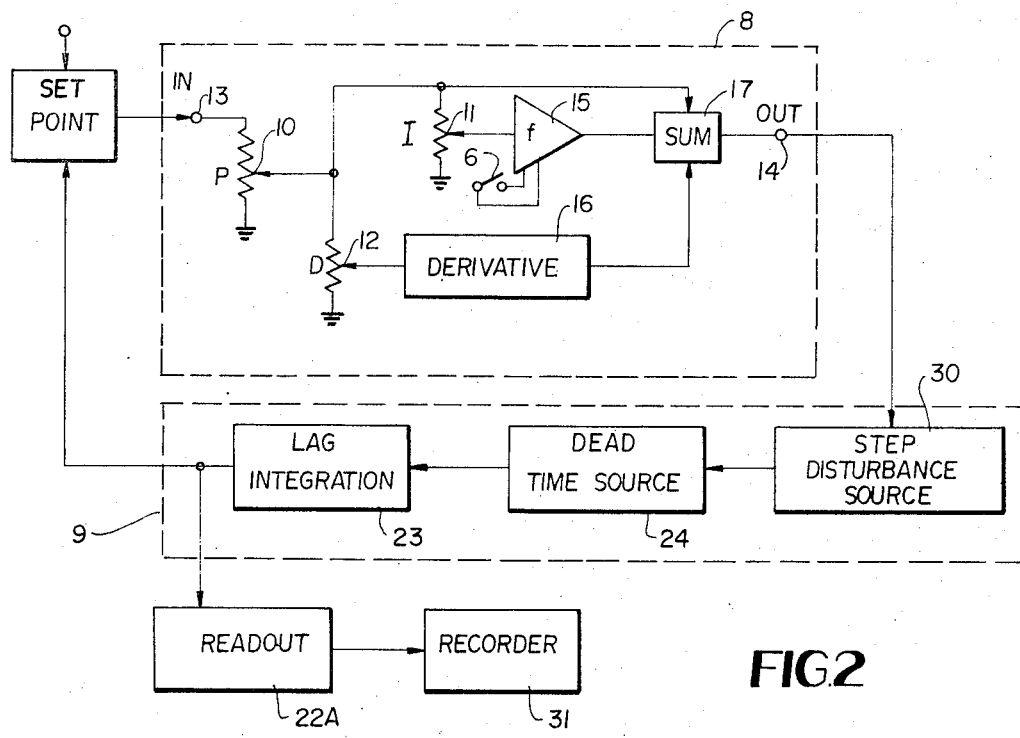
Figure 3:
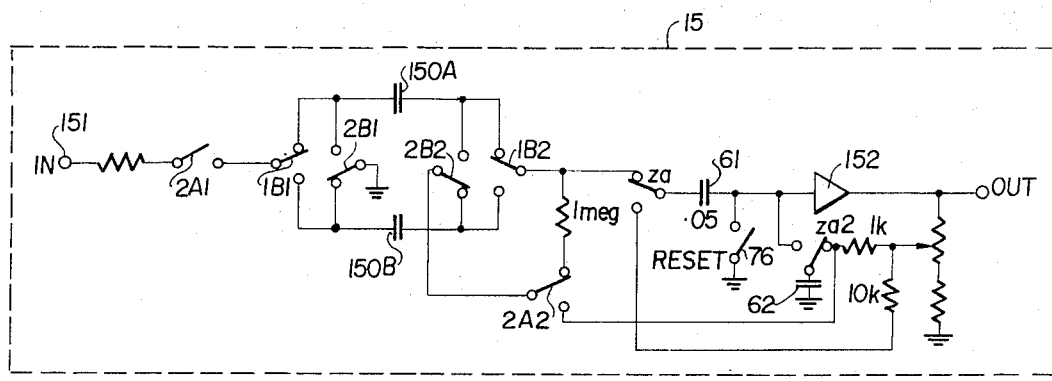
Figure 4:
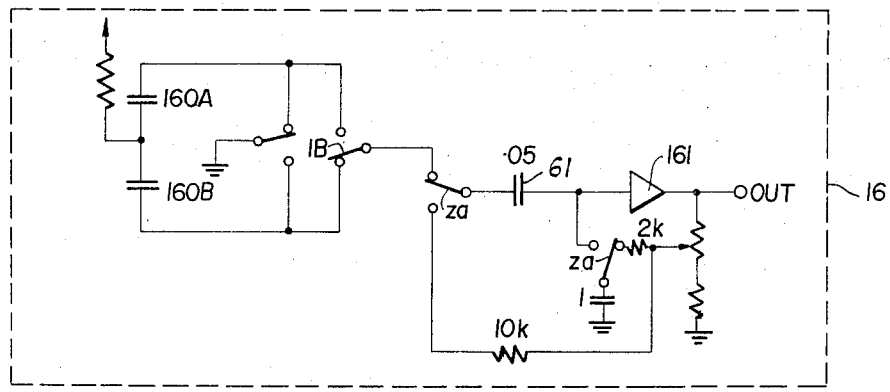
Figure 5:
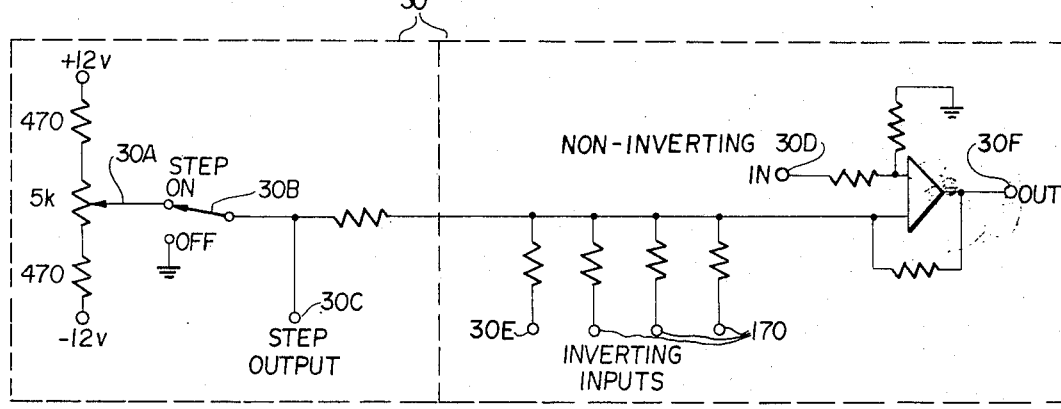
Figure 12:
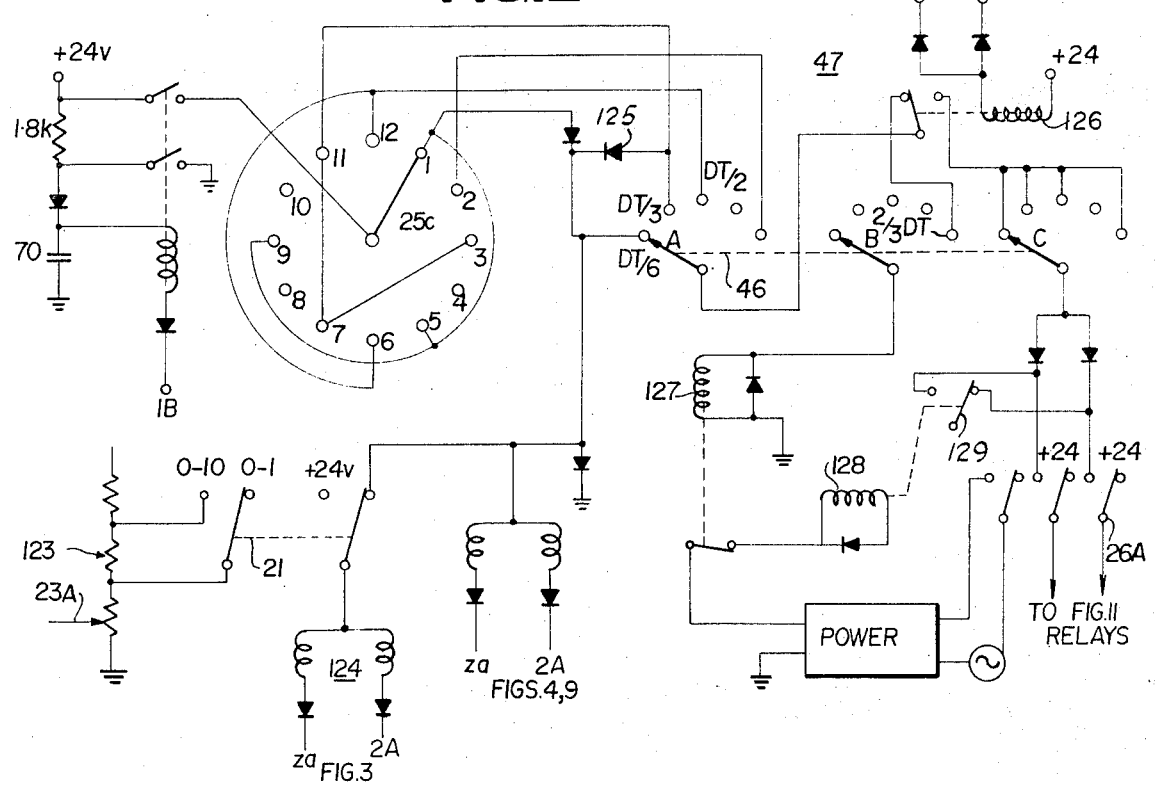
Figure 13:
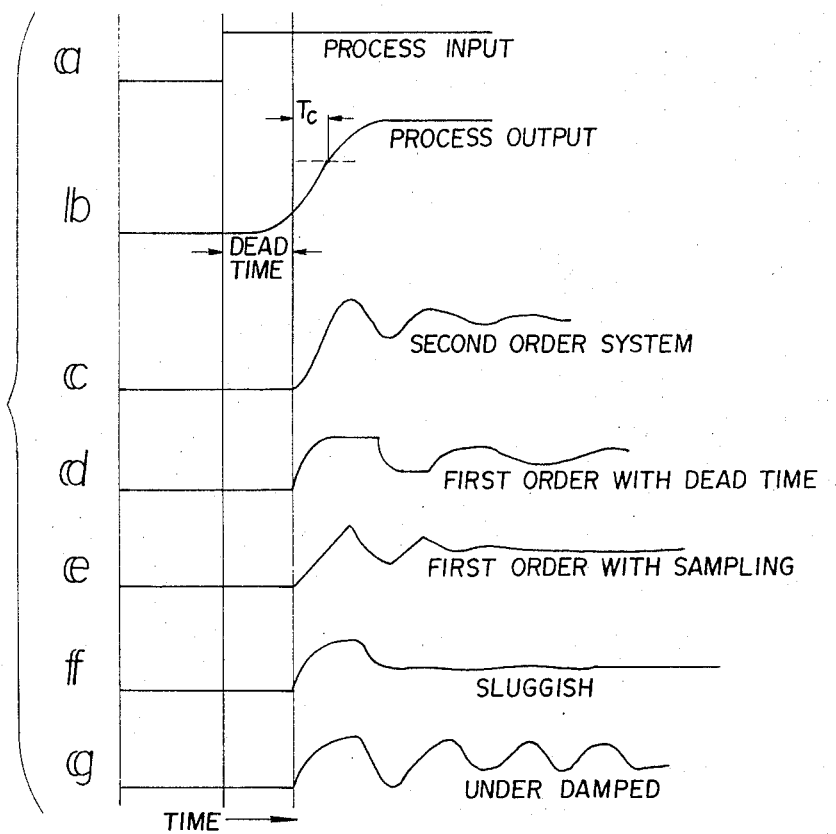

Further objects, features and advantages of the invention will be evident from the following description of a preferred embodiment, with reference to the accompanying drawings, wherein:

FIG. 1 is a sketch of a control panel layout illustrating the operational parameters available in the process control simulator afforded by this invention, FIG. 2 is a block diagram of the electronic process control simulation instrument afforded by this invention, FIG. 3 is a schematic circuit diagram of integrator circuitry utilized in the instrument, FIG. 4 is a schematic circuit diagram of a successive pulse difference circuit utilized in the invention, FIG. 5 is a schematic circuit diagram of a summation circuit processing control signals in the instrument, FIG. 6A is a logic sketch of the process control portion of the instrument with typical waveform diagrams shown in FIG. 6B, FIG. 7 is a block diagram of a readout smoothing circuit afforded by the invention, FIG. 8 is a typical high-impedance amplifier circuit used in accordance with the invention to readout stored analog signals from small value capacitors, FIG. 9A is a schematic logic diagram of a prior pulse memory circuit used in the invention and FIG. 9B is an accompanying waveform diagram, FIG. 10 is a schematic logic diagram of a dead-time readout circuit afforded by the invention, FIG. 11 is a schematic circuit diagram of logic control circuits afforded by the invention, FIG. 12 is a schematic logic diagram of a slow-sampling circuit configuration afforded by the invention, and FIG. 13 is a set of typical process control waveforms illustrating operation of the invention.

Referring now to the drawings, like reference numbers are cross-referenced throughout the various views to indicate similar functional apparatus, and those circuits well-known to those skilled in the art are shown in one-line block diagram form, since it is only a matter of skill in the art to employ such conventional circuitry and make the necessary interconnections of power and signal-matching channels.

In particular, the views of FIG. 1 and FIG. 2 may be considered together to provide an understanding of the process control simulation instrument configuration afforded by this invention, where FIG. 1 shows the controls and FIG. 2 the system organization. The electronic process simulator instrument has two sections, a three-mode controller section 8 and a process section 9.

CONTROLLER SECTION

As shown in FIG. 1, calibrated controls 10, 11, 12 exist for setting the three modes gain (P), reset or integration (I) and rate or difference (D) at various values. The organization of the controller section 8 is shown in FIG. 2, where an input analog electronic signal level or repetitive pulse level representative of the existing state or set point of an industrial process is entered at terminal 13, and the output signal after processing through the circuits effecting interaction of three modes is taken from terminal 14. As shown in FIG. 1, these terminals, along with other key circuit connections, may be accessible for connection to internal or external circuits by way of plugboard section 7, so that each unit may be used alone or in combination with other units. The plugboard connections are shown for the system operation of the instrument, as shown in FIG. 2.

In the controller section 8, the potentimeter control 10 is used to adjust the gain P so that the scale factors of I and D are also varied; thus, providing an "ideal" interacting three-mode system. The controller contains integration circuit 15, which adjusts over a period of time to input signals, and which may be reset by cancelling the integrated signal by means of a reset switch 6. The controller section 8 inverts the signal polarity by means of the operational amplifier summing circuit 17, which adds the three-mode signals together to produce an inverted output signal at terminal 14. All other stages of the instrument are non-inverting.

The potentiometer P for the gain mode controls the signal amplitude to the integrator mode potentiometer I and the derivative mode potentiometer D, and, thus, establishes the overall gain in the controller section 8. The amount of integration and derivation input signal level is set by corresponding controls 11 and 12.

Scale factors of the controller preferably are set to produce a specific relationship. An overall gain of two is provided at full dial setting (100) of gain control 10; thus, giving unity gain at the half dial setting (50). In this way, instability of loops with small lags can be investigated by use of gains greater than unity. As will be later shown, the instrument operates on a cyclic dead-time basis. The gain of the integrator scale I is 10 at full dial setting (100). Thus, with P and I controls 10 and 11 at full scale the integrator gain is set so that with a 1 volt input into terminal 13, a change in output terminal 14 of 10 volts is produced in one dead-time cycle. The gain of derivative circuit 16 is set so that with P and D controls 10 and 12 set at full scale, application of a step change in input voltage at terminal 13 will produce in addition to the amplified and inverted step, twice the step voltage at the controller output terminal 14 over the duration of one pulse interval only.

The integrator 15 is actually a summing circuit with an output equal to the running total of the amplitudes of all the sampled signal pulses applied to its input, as shown in FIG. 3. The sum is formed by connecting a capacitor 150A or B, which contains the sum voltage at the previous sample time in series aiding with the current sampled voltage applied at the input terminal 151, under control of switching circuits to be described later. The integrator operational amplifier 152 is shown in FIG. 8.

The successive pulse difference or derivative circuit 16, as shown in FIG. 4, operates similarly except that the voltages are connected in series subtracting polarity. In the operation of this circuit, the relay contacts 1B connect the last charged capacitor 160A or 160B in series subtracting with the previously charged one.

The summing and inverting amplifier 17 is connected, as shown in the right hand section of FIG. 5, to provide the inverted sum of the input signals at terminals 170. This amplifier is available in the art under conventional integrated circuit configuration types such as CA 3047A produced currently by RCA.

PROCESS SECTION

In the process section 9, the output signal of the controller is processed through a step disturbance source 30, a dead-time unit 24 and a lag-integration circuit 23, each of which has correspondingly numbered controls.

The step disturbance source 30 may take the configuration of FIG. 5 where the step source is a steady state d-c voltage level (up to 10 volts) positive or negative in polarity as provided by control 30A. The step output is generated by switch control 30B and is supplied to the operational amplifier section. A step output signal may be taken also from terminal 30C, and external step generators, steady-state or periodic, or noise or other signal generators may be used by coupling to inverting and non-inverting input terminals 30D and 30E, if desired.

The logic diagram of the dead-time source 24 and the lag-integration circuitry 23 is shown in FIG. 6A. Thus, a set of memory capacitors 40A, etc., is scanned by a variable speed timing motor 25 connected to a switch arm 25A so that a cyclic dead-time period of variable duration is afforded by speed control 24A for a connection cycle of successive capacitors 40A, 40B, etc. The capacitors 40 are coupled to input circuits at input terminal 24B to receive and store the analog level of a signal input until sampled at output terminal 24C, when the sampling switch 26A is operated.

As may be seen better by reference to FIG. 10, the dead-time readout circuit operates from logic selection controls provided in sequencer section 26 to provide an output from operational amplifier section 80 which has amplifier 281 (FIG. 8) which serves to read voltage from small capacitors 40 without significant drift especially when connected with a zero adjust (za) drift compensation circuit to be described later.

The dead-time memory configuration shown consists of two sets of 12 memory capacitors 40A – 40M –, each set wired for scanning by a switch bank 25A or 25B respectively, at a rate to be determined by motor speed control 24A. The capacitor banks are alternately connected by relay 1B operated from switches 25D and 25E in a manner to be later described (FIG. 11).

In this configuration, the step switch banks 25A, 25B have 12 contacts each so that a total of 24 capacitors are sampled for each switch shaft revolution. The motor is provided with a 12-to-one gearbox 25F so that the motor shaft rotates at 12 times the switch shaft speed, thus rotating once each capacitor selection. A magnet 25G on this motor shaft operates reed switches 25D and 25E; and, thus, relay contacts 1B (FIG. 9A) alternately during each shaft revolution to provide alternate selection of capacitors 40A–L and 40M–X during each switch step, and, consequently, provide sequential scanning of 24 capacitors.

When the sampling switch 26A is on (FIG. 6A) data read in and out of the memory is sampled for only selected ones of the sequentially presented capacitors 40. The frequency of the sampling is controlled optionally by a sampling rate switch 46, which selects a sampling rate such as one-sixth the dead-time setting as will later be described in connection with the slow sampling unit 47 (FIG. 12). Thus, a range of periodic data may be simulated, and with the sampling switch 26A off continuous data is sampled. The third deck 25C (FIG. 10) of the motor driven switch is utilized for the sampling.

The lag-integrate circuit 23 (FIG. 6A) is open looped when switch 19 is set to "integrate" and has a closed loop through polarity inverter unity gain operational amplifier 49 when the switch 19 is set to "lag." Gain is set by potentiometer control 23A. Because of the many sampling pulses per dead-time interval summation of the sampled pulses results in a very close approximation to the true integral at the sampling instants. The incremental integration provides much lower drift rates (such as 1 or 2 mv per sampling interval) than capable with conventional analog circuitry. Since the output changes in steps, a smoothing can take place in the readout circuitry 22', which is part of the readout section following the lag-integrator 23.

The readout circuit may be connected by plug board to any point in the circuit that the voltage need be monitored and readout can occur on meter 56 (controlled by switch 55) or strip recorder 31 (FIG. 1).

The adjustable scale factor accomplished by control 23A of the integrator circuit 23 controls the change of output voltage per unit of input voltage in one dead-time interval with a full-scale reading (100) of 10 volts.

The range switch 21 when set "0–10" causes summation to occur twenty-four times in each dead-time interval and in the "0–1"position summation occurs six times per dead-time interval. Thus, the reduced sampling rate accomodates sluggish response simulation.

When the switch 19 is set to "lag" the output of the circuit by means of the closed feedback loop gradually approaches the input voltage, thereby operating as a low-pass filter. The dial control 23A and range switch 21 then control the time constant of the circuit. This relationship provides a time constant TC equal to the dead-time interval divided by the integrator scale factor K which is equal to the dial setting 23A identified in the range switch setting. Thus, the dead-time adjustment control 24A also determines the time constant, to provide a wide range with very little change in form of the transient response or degree of stability in the closed-loop system being simulated. This flexibility provides for simulating sluggish systems in real-time or in studying such systems in accelerated time by simply adjusting the dead-time control 24A. The steady state gain of the "lag" configuration is unity and loop gain can be established by controller section gain dial 10 (P).

READOUT

The readout circuits may be smoothed because of the sampling step-wise approximation caused in the two dozen samples taken each dead-time cycle.

After being delayed, the input signal is re-constituted by a "hold" circuit and by an interpolation circuit which, in effect, "draws" straight lines between the sampled quantities. These straight lines are, of course, an approximation to the original signal. If the original signal contains very high-frequency components (rapid changes), these components will not be reproduced faithfully by the straight lines. Thus, the delay circuit, with its straight-line approximation, acts as a low-pass filter.

It turns out that in most applications of analog computers, and in control systems, the system itself is low-pass. This means that the straight-line approximation is not important in the simulation of such systems, i.e., that the approximation is very good.

It should be re-emphasized that the approximation error is in amplitude, not in phase, and the delay remains a true time delay.

The approximation error is at its maximum near the peak of the sine wave representing the input signal, as shown in FIG. 7. The peak error is $(1 - \cos \theta)$, and the smoothed error is 0.7 times that value. To keep the error below 0.6 percent requires that the period of the signal equal the dead-time or exceed it. Higher frequencies are reproduced less accurately, but this is less important in control studies.

As shown in FIG. 7, the smoothing circuit configuration output of integrator 23 is shown in block diagram form 221 with its associated system units, the prior pulse memory circuit 60 (FIG. 9) and the successive pulse difference circuit 16 (FIG. 4), where operational amplifier 65 has input leads 63, 66 respectively derived from integrator 23 and prior pulse memory circuit 60 as filtered by resistor capacitor network 64.

HIGH-IMPEDANCE AMPLIFIER

As before described, most of the operational amplifiers are conventional in nature, but those such as 152 in FIG. 3 or 161 in FIG. 4 have unity gain for reading out stored voltages from capacitor memory devices. Thus, the particular circuit of FIG. 8 is important to permit use of small (0.1mfd) capacitors with little loading because of high input impedance and very low leakage current. The input transistor 81, thus, may be type 3N128 (RCA MOSFET) driving a Darlington pair 82 (Motorola MPSA65) which serves as the output stage of the operational amplifier. Two feedback loops are used. The inner loop 83 being taken from voltage divider 84 across the output to provide the bias for Mosfet 81, as well as feedback with a control 85 adjusted to provide output at zero with input at zero.

The loop gain is several hundred so that the overall loop gain tends toward unity and applied through voltage divider 84 with a gain of about 0.9, the overall circuit gain is about 1.11. The variation or drift with temperature is adjusted by the zero-adjust circuitry described hereinafter. The external feedback loop employed is of slightly different form in the various circuits in which the amplifier is used.

PRIOR PULSE MEMORY

The simplest form of the prior pulse memory circuit 60 is illustrated in FIG. 9A, a circuit similar to the pulse difference circuit of FIG. 4. The circuit serves to hold the amplitude of the previous sampled data pulse so that the difference between the last two pulses can be measured as a basis for interpolation. The arms of relay 1B reverse position at the beginning of each sampling interval, as will be explained hereinafter in connection with the logic diagram of FIG. 11.

As shown in FIG. 9A, assume the current sampling pulse is applied by way of relay contacts 2A and 1B1 to charge the top capacitor, one of the set 40A–L. Then the voltage on the bottom capacitor, one of the set 40M–X, is being read out by means of relay contacts 1B2. The cycle is repetitive continuously.

In the integrator circuit of FIG. 3, a more extensive control pattern is necessary, necessitating additional relay contacts 2A2, and 2B.

DRIFT COMPENSATION

To reduce errors which might be introduced by drift, a zero adjust circuit (za) is provided as illustrated in FIG. 9A. Thus, the zero adjust relay contacts $za1$ and $za2$ are operated to change contact positions during each cyclic application of a pulse (2A) to the memory capacitors, as shown by the waveforms of FIG. 9B.

In operation, the $za1$ contact connects the 0.05mfd capacitor 61 across the operational amplifier 161 in reverse polarity. Thus, any shift in zero adjustment of the amplifier is impressed upon capacitor 61. After the za time interval, this capacitor is again connected in series with the amplifier 161 to null out the error.

The other $za2$ contact is connected to a 1mfd capacitor 62, which holds and applies the signal voltage of the amplifier to the input so that the voltage level is not allowed to float to affect the zero level by action of any nonlinearity in the amplifier 161. This capacitor 62 serves the additional function of charging the 0.05mfd capacitor 61, so that the charge need not be taken from the memory capacitors 40, thereby preventing errors in the stored data.

The zero adjust operating sequence is as follows:

1. Relay 1B reverses its position.
2. Relay 2A operates, applying the input signal to one of the memory capacitors. The amplifier is now reading-out the voltage on the other memory capacitor, and it applies this read-out voltage to the 1mfd za capacitor 62.
3. Relay za operates, charging the 0.05mfd capacitor to cancel out any zero error which may exist in the amplifier.
4. After the end of the za pulse, the operational amplifier resumes reading-out the voltage of the prior pulse, and it has now been drift-corrected.
5. Relay 2A opens, so that the sampled data will be held throughout the pulse interval, regardless of further changes in the input voltage.

The zero adjust circuit operates similarly in the integrator circuit of FIG. 3, and is shown also related to the dead-time operation cycle in FIG. 10. The overall timing relationship is also shown by the waveforms of FIG. 6B related to the logic diagram of FIG. 6A.

LOGIC

The logic diagram of FIG. 11 is related with the dead-time cycle of FIG. 10, wherein the reed switches 25D and 25E provide alternating pulses at the input terminals of FIG. 11 to identify each capacitor reading cycle appearing 24 times during the dead-time cycle. The corresponding operational relays ZA, 1B, 2A and 2B, with their contacts previously described are not shown, but they are operated by logic signals at the similarly designated output leads. Also, as shown in FIG. 6B, the timing waveforms show the sequence of operation of the various output signals.

Accordingly, relays 180 and 181 are alternately actuated upon receipt of input pulses from the respective magnetic reed contacts actuated by the magnet rotating on the shaft of the motor 25 (FIG. 10). Relay 180 controls the operation of relay 1B with one set of contacts to reverse the contacts of relay 1B with successive pulses as controlled by the contact connections illustrated between relays 180 and 181; thus, providing a ratchet-like operation where relay 1B is energized for one input 25D, E and is deenergized for the alternate input. Thus, pulse 25E operates relay 180, which is held in operation by the upper contact set until pulse 25D operates relay 181 to break the lower contact set. Conversely, relay 181 is held in operation by the lower contact set on relay 180 until it is operated by the succeeding 25E pulse. The relays 180–181 effectively operate as a flip-flop circuit and the output 1B changes from one state to the other upon receipt of alternate pulses.

Relay 182 is operated by lead 87 for each input pulse 25D, E so that a cyclic pattern is produced for each capacitor readout cycle 24 times per dead-time interval from outputs za, 2A and 2B, and provides the output cycle 2A from its uppermost contacts. Time delay circuit 88 provides for holding in relay 182 for a period long enough to complete the operation cycle of the logic sequence.

Relay 86 is also actuated during the 2A period and its contact is connected to hold in the relay until it is released by a 2B pulse, thus causing the 2B pulse to follow the terminaion of the 2A pulse and the 2B pulse lasts for a duration established by operation of relay 185.

Storage capacitors 89, 90 and 91, time the operation of corresponding relays 183, 184 and 185.

Thus, when relay 82 is operated capacitor 89 is charged through resistor 92 when relay 182 is released relay 183 is operated by the charge on capacitor 89. This provides a za output pulse by means of the upper contact set and the lower contact set charges capacitor 90 until relay 183 is released at the end of the za pulse period by discharge of capacitor 89.

The lower set of contacts on relay 183 charge capacitor 91 during the pulse. Release of relay 183 operates relay 184, etc. When the current from capacitor 90 falls, relay 184 is released then operating relay 185 for the 2B pulse period and releasing the relay 86 held in operating condition by the contact set on relay 185. Thus, the timing pulse sequence shown in FIG. 6B is generated.

Separate relays may be actuated for the respective dead-time, integrator, differentiator and memory circuits, etc., to produce the local 1B, 2A, 2B, za pulses.

SAMPLING CIRCUITS

As described in FIG. 10, one motor driven switch section 25C is used for sampling, as illustrated in FIG. 12. The various input pulses and timing is referenced to FIG. 6B by the input pulse notation, and the controls are cross-referenced to FIG. 1.

When the sampling switch 26A (FIG. 1) is on, the sampling circuit operates and the relays of the dead-time readout circuit of FIG. 10 are energized at a frequency determined by operation of the sample rate switch 46. When the switch is set counterclockwise to DT/6, for example, the sampling interval is one-sixth the dead-time setting. This means that every fourth one of the 24 sampling intervals is used to provide six samples per dead-time.

In this mode of operation, as shown by the switch 46 setting, the sampling circuit operates as follows. Sampling periods 1, 5 and 9 are connected to switch arm 46A from sampling switch 25C. Then, depending upon the range setting of switch 21, now shown in the "0–1" range, these samples are applied to the 3A and 2A relays on the memory and difference circuits (FIGS. 4, 9) only or also to the integrator (FIG. 3) at the 1B time change, as afforded by operation of relay 124.

If the range switch is in the "0–10" range, then the gain in the integrator circuit is changed as shown by resistor network 123, and the integrator is sampled continuously by means of the right-hand section of switch 21, which energizes integrator relays 124 continuously. Thus, only the memory and difference circuits are sampled in this range. By means of diode 125, the same operation takes place in DT/3 and 2/3DT positions of sampling rate switch 46.

In all except the 2/3DT rate position, relay 126 serves to connect switch bank 46C for operation of the relays of FIG. 11 during the 2A and 2B time periods. In the 2/3DT operation, relays 127 and 128 operate contacts 129 to alternate connections of the appropriate relays on FIG. 11. Relay 128 is of the ratchet memory type, retaining each position until next pulsed.

Thus, pulses at switch 25C positions 3, 7, and 11 will operate relay 127 and change over relay 128 contacts 129 to provide two sets of three samples per dead time cycle.

PROCESS SIMULATION

Several typical waveforms, such as may be produced on a strip recorder output, are shown representative of process control simulation or actual control system response to step inputs. All processes encounter step disturbances due to changes in materials or products or when conditions of manufacture change. The control system should respond to these changes as quickly as possible, and in sluggish systems better tuning is especially desirable. In simulating the characteristic response of a process, the dead-time or transport delay must be introduced as shown in FIG. 13b, and the Time Constant should be maneuverable to set up the response slope. Also, tuning or smoothing should be available to provide critical damping rather than the sluggish response of FIG. 13f or the under-damped response of FIG. 13g. Sampling on a periodic basis is important in some processes and a typical response characteristic with sampling is shown in FIG. 13e.

The instrument afforded by this invention, therefore, simulates various properties of the process electrically and connects them together to simulate the control action, providing for varying the parameters separately and observing the effect on the control response. Optimized settings can usually be found quickly by trial-and-error experimentation, which is carried out off line without waste of time or product.

A notebook can be assembled consisting of recordings showing the result of the best adjustment, as a target for performance of the process. The notebook can also contain recordings resulting from non-optimal adjustment of each control parameter; these can be extremely valuable in starting up a newly automated process, and also later on, for quick diagnosis of failures when they occur for any reason.

Simulation has also proved to be valuable for training in basic control theory (including dead-time, etc.), or in the fine points of controlling a particular process. "Hands-on" experience is gained, without spoilage of product or damage to equipment. Moreover, learning by experimenting with a sluggish process is itself very sluggish; but with a simulator, learning can be accelerated by representing the process in a faster time scale, if desired.

FIGS. 13c, d and e show the response of various simulated systems to a step disturbance. Trace c shows a second-order system, and is familiar to students of control systems. Trace d shows the response of a system with dead-time, and trace e is for a system with slow sampling.

In use, the simulator is adjusted to resemble the process being simulated. The process generally consists of time lags plus dead-time. The values of these process lags can be estimated so that the simulator dials can be set to the proper values. If the process is already running, then a good plan is to measure these values directly by applying a step-change to the process. FIGS. 13a and b show how the lag and the dead-time can be measured from a recording of the process output. These values (whether assumed or measured) are then introduced into the dials of the "process" section of the simulator. A step-test conducted on the simulator should then match the response of the process reasonably well.

Now the control loop is connected, and tuning of the controller is carried out by experiment, guided by computational methods. Such methods are explained in Lopez, A. M., Miller, J. A., Smith, C. L., and Murrill, P. W., "Tuning Controllers with Error-Integral Criteria," INSTRUMENTATION TECHNOLOGY, November 1967, or "A Comparison of Controller Tuning Techniques," CONTROL ENGINEERING, December 1967.

OPERATION OF THE SIMULATOR

The simulator control panel and its block diagram are shown in FIG. 1 and FIG. 2. The panel is divided into two parts, a control simulator panel to the left and a processor simulator panel for lag and dead-time to the right. The simulated controller is a regular three-mode controller, the simulated process a first order lag process with dead-time up to 30 minutes. All constants can be introduced by setting the dials on the desired targets. A two pen recorder 31 is connected to the loop to record the input and output variables simultaneously. The magnitude of the disturbance or setpoint change can be selected through dial 30A. It is entered after step switch 30B is actuated. The problems can be handled in real-time or accelerated and shown in rapid sequence. Finding the correct controller constants for a three mode controller as a typical example can proceed as follows:

a. Conduct step-test and record input and output variables as shown in FIG. 13A and B.

b. Derive steady state gain, dead-time and time lag from FIG. 13b using graphical methods as illustrated.

c. Introduce constants into the dials in the process or section 9 of the simulator.

d. Conduct open loop step-test on the simulator to verify that the process has been copied properly into the simulator. This is done by recording the signal before the dead-time unit and after the lag unit of the process section using a two pen recorder.

e. Select time scale.

f. Start tuning procedure and observe recorded results.

Other modes of operation for simulating control functions with the various process portions and range of adjustments afforded will become evident as experience is gained with the instrument and any particular process that is to be simulated. Thus, for example, the simulator may be used to anticipate certain responses when different portions of the system malfunction, or the response if a new product, material or processing step is introduced.

What is claimed is:

1. A process control simulation instrument providing in combination, a multiple-process controller section adapted to convert an input voltage signal to a modified output signal voltage by operation of at least two interacting signal modification circuits providing a modified output signal, and processor equipment including a step disturbance source for introducing step functions of pre-determined amplitude into the modified output signal, a dead time source comprising storage means connected to said two interacting circuits for holding the modified signal at a plurality of discrete time intervals, sampling means for reading the stored signal after a specified periodic dead-time and means connected to modify the input signal voltage with the sampled stored signal thereby introducing the recalled stored signal into said signal modification circuits to interact therein.

2. An instrument as provided in claim 1 wherein the two interacting signal modification circuits of the controller section comprise an integrator device, a derivative device, and means to introduce the signal and to control simultaneously the input signal level to said devices.

3. An instrument as provided in claim 1 wherein the the processor equipment includes lag integration means processing said modified signal.

4. An instrument as defined in claim 3 wherein the integration means includes a selectable control and circuits selected thereby for operation of the integration means selectively in open and closed loop configurations.

5. An instrument as defined in claim 1 including readout circuit means adapted to take a succession of signals from said storage means at different ones of said discrete time intervals, and circuitry connected for processing the succession of signals for smoothing out the interpolation from one of said discrete time intervals to the next.

6. An instrument as defined in claim 1 wherein said sampling means for sampling selected ones of the signals stored by said storage means samples at less than all of said discrete time intervals.

7. An instrument as defined in claim 1 including at least one operational amplifier having input and output signal paths processing a signal within said instrument, and zero adjust means including a capacitor connected in series with the input signal path of the operational amplifier and periodically operable correction means transferring the capacitor temporarily across said amplifier input and output paths in opposed polarity to receive errors for reintroduction in series with the input signal path.

8. The instrument defined in claim 7, wherein the dead-time source provides a dead-time cycle of known duration and the zero adjust means operates cyclically once per dead-time cycle.

9. An instrument as defined in claim 7 wherein several operational amplifiers are employed each including said zero adjust means.

10. The instrument defined in claim 1 including control means for said recalling means permitting continuously variable choice of the dead-time interval.

11. The instrument defined in claim 10 wherein said control means comprises a motor and speed control means therefor.

12. The instrument defined in claim 11 wherein said storage means comprises at least one set of capacitors and a switch scanned by said motor to connect different capacitors one at a time into circuit positions to receive and read out the stored signals.

13. The instrument defined in claim 12 wherein said storage means includes two sets of capacitors, and two switches, and means synchronized with said motor to alternately connect capacitors from the two sets into said circuit positions.

14. The instrument defined in claim 12 including a high-impedance amplifier coupled to read out the signals stored by said capacitors having a field effect transistor input stage and a Darlington Pair output stage.

15. The instrument defined in claim 12 including at least one operational amplifier having input and output signal paths and means connected therein to compare input and output signals thereby to correct drift errors.

16. An instrument as defined in claim 15 including switch means connected to optionally reset the signal input level to said amplifier.

17. A process control instrument as defined in claim 1 with a two channel recorder, and means connecting said input and output signals to produce recordings on different recorder channels for comparison.

* * * * *